United States Patent
Mentink

(10) Patent No.: US 11,209,109 B2
(45) Date of Patent: Dec. 28, 2021

(54) CRIMP COUPLING FOR CONNECTING A HOSE TO A FITTING

(71) Applicant: KA Group AG, Zürich (CH)

(72) Inventor: Laurentius Andreas Gerardus Mentink, Haaksbergen (NL)

(73) Assignee: KA Group AG, Zürich (CH)

( * ) Notice: Subject to any disclaimer, the term of this patent is extended or adjusted under 35 U.S.C. 154(b) by 620 days.

(21) Appl. No.: 15/932,261

(22) Filed: Feb. 16, 2018

(65) Prior Publication Data

US 2018/0259105 A1    Sep. 13, 2018

(30) Foreign Application Priority Data

Feb. 16, 2017   (DE) .................... 10 2017 103 156.1

(51) Int. Cl.
*F16L 33/207* (2006.01)
*F16L 13/14* (2006.01)
*B21D 39/04* (2006.01)

(52) U.S. Cl.
CPC .......... *F16L 33/2071* (2013.01); *B21D 39/04* (2013.01); *B21D 39/046* (2013.01); *F16L 13/141* (2013.01); *F16L 33/2076* (2013.01)

(58) Field of Classification Search
CPC . F16L 33/2071; F16L 33/2076; F16L 33/207; F16L 13/141

(Continued)

(56) References Cited

U.S. PATENT DOCUMENTS 2,570,421 A * 10/1951 Baldwin, Jr. ....... F16L 33/2076
                                                    285/256
2,570,477 A * 10/1951 Paquin ................ F16L 33/2076
                                                    285/148.13

(Continued)

FOREIGN PATENT DOCUMENTS

DE           853232 C      10/1952
DE         1179063 B  * 10/1964   .......... F16L 33/2076

(Continued)

OTHER PUBLICATIONS

Machine-assisted English language translation for DE853232C extracted from espacenet.com database on May 17, 2018, 4 pages.

(Continued)

*Primary Examiner* — Matthew Troutman
*Assistant Examiner* — Fannie C Kee
(74) *Attorney, Agent, or Firm* — Howard & Howard Attorneys PLLC

(57) ABSTRACT

A crimp coupling includes a crimping ferrule for connecting a hose to a fitting. The fitting includes an outwardly projecting stop collar and a groove which extends circumferentially around the fitting at a constant axial distance to the stop collar. The crimping ferrule, which can be slid onto the fitting, includes a flange, a tapering hinge section, and a cylindrical section. A distance between the stop collar and the groove of the fitting is dimensioned such that the flange, when abutting the stop collar, has a lower edge facing away from the stop collar above the groove. Due to a diameter reduction of the cylindrical section and the tapering hinge section, during crimping, the flange is pivoted such that the lower edge of the flange is turned into the groove by the pivotal movement of the flange.

12 Claims, 5 Drawing Sheets

(58) Field of Classification Search
USPC .................................................. 285/242, 256
See application file for complete search history.

(56) References Cited

U.S. PATENT DOCUMENTS

| | | | | |
|---|---|---|---|---|
| 2,926,029 | A | | 2/1960 | Clair et al. |
| 3,512,810 | A | * | 5/1970 | Harris ................. F16L 33/2076 285/256 |
| 3,549,180 | A | | 12/1970 | MacWilliam |
| 3,590,455 | A | | 7/1971 | Harris |
| 4,544,187 | A | * | 10/1985 | Smith ................. F16L 33/2078 285/256 |
| 4,948,178 | A | | 8/1990 | Sauer |
| 5,285,561 | A | * | 2/1994 | Manning ............. F16L 33/2076 29/417 |
| 6,082,784 | A | | 7/2000 | Fukaya |
| 2004/0244459 | A1 | | 12/2004 | Shiokawa |
| 2012/0007356 | A1 | * | 1/2012 | Menor .................... F16L 33/01 285/257 |

FOREIGN PATENT DOCUMENTS

| | | | | |
|---|---|---|---|---|
| DE | 2459690 | A1 | | 6/1975 |
| DE | 3243365 | C2 | | 8/1985 |
| DE | 3535878 | A1 * | 4/1987 | .............. F16L 33/01 |
| DE | 3822041 | C1 | | 8/1989 |
| DE | 19700583 | A1 | | 7/1997 |
| DE | 20221504 | U1 | | 2/2006 |
| DE | 202016004177 | U1 | | 8/2016 |
| EP | 0161864 | A1 * | 11/1985 | .......... F16L 33/2076 |
| EP | 0161864 | A1 | | 11/1985 |
| EP | 0523835 | A1 | | 1/1993 |
| EP | 1154189 | A2 * | 11/2001 | .......... F16L 33/2076 |
| EP | 2510271 | B1 | | 5/2014 |
| FR | 2144147 | A5 * | 2/1973 | ............. F16L 33/18 |
| GB | 1498619 | A | | 1/1978 |
| GB | 2046388 | A * | 11/1980 | .......... F16L 33/2076 |

OTHER PUBLICATIONS

English language abstract for DE3243365C2 extracted from espacenet.com database on Aug. 16, 2018, 1 page.
English language abstract for DE19700583A1 extracted from espacenet.com database on Aug. 30, 2018, 1 page.
English language abstract for DE20221504U1 extracted from espacenet.com database on May 17, 2018, 1 page.
Machine-assisted English language translation for DE202016004177U1 extracted from espacenet.com database on Aug. 16, 2018, 26 pages.
English language abstract for EP2510271B1 extracted from espacenet.com database on May 17, 2018, 2 pages.

* cited by examiner

CRIMP COUPLING FOR CONNECTING A HOSE TO A FITTING

CROSS-REFERENCE TO RELATED APPLICATION

This application claims priority to and all the benefits of German Patent Application No. 10 2017 103 156.1, filed on Feb. 16, 2017, the disclosure of which is hereby incorporated by reference.

BACKGROUND OF THE INVENTION

The present invention relates to a crimp coupling for connecting a hose to a fitting, a method for connecting a hose to a fitting utilizing such a crimp coupling, and a method for making a crimp coupling for connecting a hose to a fitting.

Crimp couplings are used to connect flexible hoses, which can be made of elastomeric materials, to metallic fittings which in turn may be connected to another component or may terminate in such a component. A typical field of application for such hose couplings is the area of automotive engineering, where pneumatic and hydraulic fluid lines, lines for air conditioning systems, lines for pneumatic adjustment means for vehicle seats, and many other fluid lines, some of which consist of flexible hoses, are to be connected to fittings. A crimp coupling substantially comprises a fitting and a crimping ferrule which is also referred to as a clamping sleeve or crimping sleeve. The fitting comprises a cylindrical pipe end whose outer diameter is adapted to the inner diameter of the hose to be connected. It is often preferred that the outer diameter of the pipe end is slightly larger than the inner diameter of the hose such that the hose sits under tension on the pipe end due to its elastic flexibility. However, the outer diameter of the pipe end can, in principle, also be slightly smaller than the inner diameter of the hose.

Further, the fitting usually comprises an outwardly projecting, circumferentially extending stop collar which forms a limitation with respect to the sliding of the crimping ferrule onto the cylindrical pipe end. When the crimping ferrule is slid into abutment with the stop collar, the end of the hose is located within the annular space between the pipe end and the crimping ferrule, and extends to the end of the crimping ferrule which is in abutment with the stop collar. Thereafter, the crimping ferrule is deformed by means of radially inwardly acting crimping tools, such that the end of the hose located within the crimping ferrule is clamped between the crimped crimping ferrule and the pipe end of the fitting. A distinction must be made between crimp couplings for low pressure applications and those for more heavily loaded high pressure applications.

For crimp couplings used for low pressure applications, a frictional engagement of the crimping ferrule with the fitting is sufficient. Therefore, simply shaped crimping ferrules can be used, which ferrules can be produced by deep drawing. For this purpose, a metal sheet is first brought by deep drawing into the shape of a cup, i.e., a substantially cylindrical shell having a closed bottom side which is substantially planar and which merges with a curved edge region into the cylindrical portion. A circular opening is formed in the closed bottom side by stamping, wherein the opening is coaxial with the ferrule axis. After stamping the opening, a circumferentially extending flange remains at the margin of the opening in the originally closed bottom side, which flange is directed towards the ferrule axis and has a wall surface formed by stamping and facing the ferrule axis, which wall surface extends parallel to the sleeve axis. Crimping ferrules of this type are described, for example, in DE 38 22 041 C1 and in DE 20 2016 004 177 U1.

Such crimping ferrules can be used with fittings formed by cold forming from a cylindrical piece of pipe, wherein, by folding a stop collar, a contact surface is created to which the flange of the crimping ferrule comes into contact after sliding the ferrule onto the cylindrical pipe end. After crimping the crimping ferrule, as already mentioned above, a pure frictional engagement of the clamping ferrule is obtained, for which reason such crimp couplings are used only for low pressure applications and for applications where no tensile forces act on the hose, and thus, there is no risk that the hose and the crimping ferrule can be disconnected from the fitting.

For crimp couplings which are under greater loads, more complicated manufactured crimping ferrules must be used, because they must be brought in positive engagement with the fitting by crimping. Such a complicated formed crimping ferrule is described, for example, in EP 2 510 271 B1, which comprises, in addition to the cylindrical portion and the flange at the front opening, another wall piece projecting from the flange, which wall piece is formed during crimping by means of a complicated crimping tool and therefore comes into contact with the side of the stop collar facing away from the flange of the clamping sleeve, and thus provides a positive engagement with the stop collar of the fitting. Further examples of crimp ferrules provided with structures which, after crimping, come into positive engagement with complementary counter-structures on the fitting, are described in EP 0 161 864 A1 and in DE 32 43 365 C2. Such crimp couplings suitable for higher loads have the disadvantage that the associated crimping ferrules cannot be easily manufactured by deep drawing and stamping an opening, but require more complicated manufacturing processes. EP 0 161 864 A1 describes that a crimping ferrule can be cast with its engagement structures, or that these engagement structures have to be produced by machining processes. Therefore, such crimp ferrules for crimp couplings used for higher loads are much more expensive compared to the above firstly described crimping ferrules which can be easily manufactured by deep drawing and stamping.

BRIEF SUMMARY OF THE INVENTION

It is an object of the present invention to provide a crimp coupling which is configured for connecting a hose to a fitting in such a way that, by means of a simple and inexpensively manufacturable crimping ferrule, a positive engagement between the crimping ferrule and the fitting can be obtained after squeezing. Further, it is an object to provide a method for making such a crimp coupling, and a method for connecting a hose to a fitting utilizing such a crimp coupling.

To solve this problem, a crimp coupling comprising the features of claim 1 is provided. A method for connecting a hose to a fitting utilizing such a crimp coupling is defined in claim 11. Finally, a method for making a crimp coupling for connecting a hose to a fitting is defined in claim 12. Preferred embodiments of the invention are defined in the dependent claims.

The crimp coupling for connecting a hose to a fitting comprises the fitting on which an outwardly projecting stop collar and a groove are formed, which groove circumferentially extends around the fitting at a constant axial distance to the stop collar. The crimp coupling further comprises a crimping ferrule which can be slid onto the fitting and which is formed by deep drawing, and in which a circular, coaxial front opening is stamped in the originally closed bottom side for sliding the ferrule onto the fitting. The crimping ferrule comprises, at its front end, a flange directed towards the ferrule axis, which flange remained as a margin after stamping the front opening in the originally closed bottom side and which is oriented with its stamped wall surface parallel to the ferrule axis. A cylindrical section is formed at the other end of the crimping ferrule, which section extends over the major part of the length of the crimping ferrule. The distance between the stop collar and the groove of the fitting is dimensioned such that the flange of the crimping ferrule, when it is in abutment on the stop collar, is disposed with its rearward lower edge facing away from the stop collar above the groove. In the crimping ferrule, between the flange and the cylindrical section, a tapering hinge section is formed, which hinge section is formed in a tapering manner starting at a larger radius to the ferrule axis at the adjoining cylindrical section to a smaller radius at the adjoining end of the flange in such a manner that the hinge section is, due to the diameter reduction of the cylindrical section during crimping, pivoting with its end carrying the flange in outward direction relative to the cylindrical section and is approaching a parallel orientation to the ferrule axis. Thereby, also the flange is pivoted such that the lower edge of the flange facing away from the stop collar is turned into the groove by the pivotal movement of the flange.

All information with respect to shapes and positions defined in the claims relate, unless otherwise indicated, to the non-squeezed initial state of the crimp coupling. If reference is made to the radii of the crimping ferrule, the radius of the outer wall of the respective ferrule part is meant.

The inventive configuration of the crimping ferrule and the fitting ensures that, by squeezing the crimping ferrule, a positive engagement with the fitting with respect to axial movements is realized. In the course of the crimping operation, the diameter of the cylindrical section is reduced such that the adjoining end of the hinge section is also moved with smaller radii towards the ferrule axis. At the front end, the hinge section is supported, via the flange, by the fitting such that here no movements towards smaller radii are possible in a first step. Because only the end of the hinge section adjoining the cylindrical section is moved towards smaller radii, the entire hinge section conducts a pivotal movement which progressively leads to a parallel orientation thereof with respect to the ferrule axis. Thereby, also the flange adjoining the hinge section is pivoted, wherein the stamped wall surface of the flange, which was initially parallel oriented to the ferrule axis, is slanted with respect to the of the ferrule axis, whereby the lower edge of the flange facing away from the stop collar is pivoted in downward direction and is turned into the groove of the fitting. As a result, the lower edge of the flange facing away from the stop collar is located within the groove, and the wall surfaces of the flange extending from the lower edge abut against the margins of the groove such that a positive engagement is formed between the flange and the groove.

In order for the hinge portion to pivot sufficiently in the diameter reduction of the cylindrical section during crimping, the tapering of the hinge section must have a certain minimum extent, which can be achieved in particular if the cylindrical section has a diameter which is greater than that of the hose located between the fitting and the crimping ferrule, such that before the crimping an annular space between the cylindrical section of the crimping ferrule and the hose remains free. When closing this annular space in a first phase of the crimping process there is already a pivotal movement of the hinge section which, in the final phase of the crimping process, is increased, thus resulting in an overall pronounced pivotal movement which is advantageous for the positive engagement with the fitting.

In a preferred embodiment, the hinge section is configured such that the ferrule wall in the hinge section has an average slope in the range between 5° and 30° to the ferrule axis. The average slope of the ferrule wall of the hinge section is defined by the straight line which connects the connection point of the hinge section with the flange and the connection point with the cylindrical section; the slope of this connecting line to the ferrule axis is the average slope of the hinge section.

In a preferred embodiment, the tapering of the hinge section is configured such that the hinge section bridges a radius range to the ferrule axis that is so large that the difference of the larger radius (adjacent the cylindrical section) and the smaller radius (adjacent the flange) amounts to at least 5% relative to the larger radius. Preferably, the difference of the larger radius and the smaller radius relative to the larger radius may be between 10% and 15%.

In a preferred embodiment, the hinge section may be conically shaped such that the ferrule wall is conically tapering in the hinge section. In this case, the average slope of the hinge section is equal to the slope of the ferrule wall of the hinge section. However, in addition to such a conical configuration of the hinge section, other tapering configurations are possible, e.g., a tapering in two or more steps or a tapering with a changed slope of the ferrule wall in the course of the hinge section.

In a preferred embodiment, the cylindrical section occupies more than 60% of the length of the crimping ferrule in the longitudinal direction.

In a preferred embodiment, the conically formed section occupies between 10% and 30% of the length of the crimping ferrule in the longitudinal direction.

In a preferred embodiment, the crimping ferrule is made of low carbon steel, stainless steel or brass.

In a preferred embodiment, the crimping ferrule has a wall thickness in the range of 1 to 2 mm.

In the method for connecting a hose to a fitting utilizing a crimp coupling according to the invention,
the crimping ferrule and the hose are slid onto the fitting until the flange of the crimping ferrule comes into abutment on the stop collar and until the hose is slid onto the end of the fitting surrounded by the crimping ferrule and the inserted end of the hose is in abutment on the inner side of the flange of the crimping ferrule,
in a first crimping step forces directed towards the ferrule axis are exerted exclusively on the cylindrical section to reduce its diameter until the inner side of the cylindrical section reaches the hose, to thereby reduce the sloping angle of the hinge section to the ferrule axis,
and in a subsequent second crimping step crimping forces are uniformly exerted on the cylindrical section as well as on the hinge section until the hose is clamped between the crimping ferrule and the fitting,
whereby the hinge section has, by the first and second crimping steps, approached a cylindrical shape and by the reduction of the slope of the hinge section the flange on it has turned such that its lower edge remote from the stop collar has turned into the groove.

In the method for making a crimp coupling for connecting a hose to a fitting, on a metal tube an outwardly projecting stop collar is formed, and in axial direction in constant distance thereto a circumferentially extending groove is formed to provide a fitting, a crimping ferrule is formed by deep drawing a metal sheet, in which crimping ferrule in the originally closed bottom side an opening is formed by stamping, through which opening the crimping ferrule can be slid onto the fitting, wherein the crimping ferrule has at its front a flange directed towards the ferrule axis, which flange remained as a margin after stamping the front opening in the originally closed bottom side and which has a stamped wall surface parallel to the ferrule axis, and has at its back a cylindrical section extending over a major part of the length of the crimping ferrule, wherein the distance between the stop collar and the groove of the fitting is dimensioned such that the flange, when it is in abutment on the stop collar, is disposed with its lower edge of the stamped wall side remote from the stop collar above the groove, wherein during deep drawing the crimping ferrule between flange and cylindrical section a tapering hinge section is formed which, starting from a larger radius to the ferrule axis at the adjoining cylindrical section, extends in a tapering manner to a smaller radius at the adjoining end of the flange in such a manner that during crimping of the crimp coupling the hinge section is with its end carrying the flange pivoted outwards compared to the opposite end by diameter reduction of the cylindrical section during the crimping, whereby also the flange is pivoted such that its lower edge remote from the stop collar is turned into the groove by the pivoting of the flange.

In a preferred embodiment of the method, the crimping ferrule after deep drawing is exposed to an annealing treatment to make the metal of the crimping ferrule softer again.

In a preferred embodiment of the method, the fitting is formed by processing an originally cylindrical metal tube by folding and by compressing in a cold forming manner to form an outwardly projecting stop collar and whereby, likewise in a cold forming manner, a roller is used to form the groove by rolling.

In a preferred embodiment of the method, besides said groove, further grooves are simultaneously formed by a rolling tool in the outer wall of the fitting further away from the stop collar by means of further rollers.

BRIEF DESCRIPTION OF THE DRAWINGS

The invention is explained below on the basis of an embodiment with reference to the drawings, in which:

FIG. 1 is a schematic cross-sectional view of an embodiment of the crimp coupling at a first point in a method of connecting the hose to the fitting by using the crimp coupling, with an additional enlarged view of a contact area of the flange and the stop collar shown.

FIG. 2 is a schematic cross-sectional view of an embodiment of the crimp coupling at a second point in a method of connecting the hose to the fitting by using the crimp coupling, with an additional enlarged view of a contact area of the flange and the stop collar shown.

FIG. 3 is a schematic cross-sectional view of an embodiment of the crimp coupling at a third point in a method of connecting the hose to the fitting by using the crimp coupling, with an additional enlarged view of a contact area of the flange and the stop collar shown.

FIG. 4 is a schematic cross-sectional view of an embodiment of the crimp coupling at a fourth point in a method of connecting the hose to the fitting by using the crimp coupling, with an additional enlarged view of a contact area of the flange and the stop collar shown.

FIG. 5 is a schematic cross-sectional view of an embodiment of the crimp coupling at a fifth point in a method of connecting the hose to the fitting by using the crimp coupling, with an additional enlarged view of a contact area of the flange and the stop collar shown.

It should be appreciated that the drawings are illustrative in nature and are not necessarily drawn to scale.

DETAILED DESCRIPTION OF THE INVENTION

In the following embodiment, the crimping ferrule comprises a conically tapered hinge section that bridges the distance from a larger radius of the cylindrical end part to the smaller end radius of the flange. However, it should be noted once again that the tapering in the hinge section does not necessarily have to be done with a constant slope, but the slope of the ferrule wall in this section may vary or may provide the tapering in several steps. Nevertheless, in the following with reference to the embodiment shown in the figures, the term "conically" tapered section is used.

The flange usually has a slope of 90° to the ferrule axis or almost 90°. In contrast thereto, the tapered section has a much smaller average slope, wherein the average slope is defined as the slope of the connecting line through the initial radius of the tapered hinge section at the flange and through the larger radius at the end of the hinge section. The average slope of the hinge section is preferably between 5° and 30°.

Figure 1:
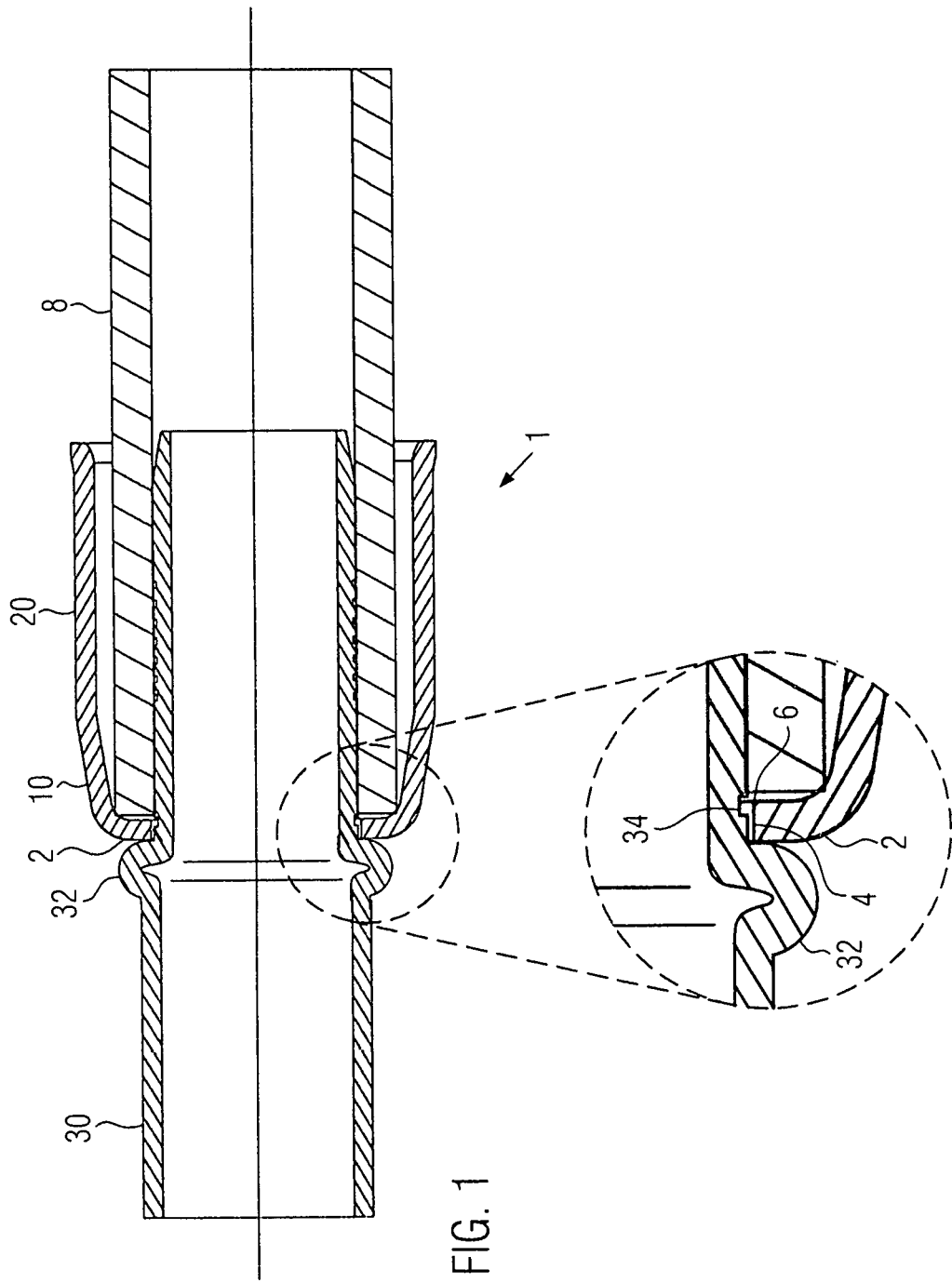
FIGS. 1-5 show schematic cross-sectional views of an embodiment of the crimp coupling in successive steps utilizing a method according to the invention for connecting a hose to a fitting by using a crimp coupling according to the invention, wherein in addition thereto an enlarged detail of a contact area of the flange and the stop collar is shown.

FIG. 1 shows the crimp coupling in the initial state after hose 8 and crimping ferrule 1 are slid onto the end of the fitting 30, and before the crimping process has begun.

The fitting 30 is provided with a stop collar 32 which was formed at an originally cylindrical metal tube by folding in a cold forming process. Further, the fitting 30 is provided with a circumferentially extending groove 34 in the outer wall near to the stop collar and parallel thereto, which groove is needed to realize a positive engagement with the crimping ferrule, as will be described below. In addition, the outer diameter of the fitting 30 is, in the region of the pipe end remote from the stop collar (right end in the figures), made slightly smaller compared to the outer diameter adjacent to the stop collar 32 to adapt this pipe end to the hose to be connected. In addition, the fitting is provided at its line end, onto which the hose 8 is slid, with additional circumferentially extending grooves which are intended to improve the holding action for the trapped hose and the sealing effect by pressing material of the hose by means of the crimping process into these grooves, wherein the sealing effect is improved by a plurality of such "sealing rings" arranged one behind the other.

The crimping ferrule 1 has a front opening surrounded by a flange 2, by means of which it can be slid onto the line end of the fitting 30. In a first step, the crimping ferrule 1 is formed by deep drawing a metal sheet to a cup-shaped body, wherein thereafter a circular opening is stamped in the closed bottom side of the cup-shaped member, such that the flange 2 remains as a margin of the originally closed bottom side. The flange 2 is directed towards the longitudinal axis of the crimping ferrule 1 and is oriented with its inner wall surface 4 made by stamping parallel to the longitudinal axis of the crimping ferrule 1. The deep drawing of the crimping ferrule 1 is carried out for this embodiment in such a manner that the ferrule wall forms a conical hinge section 10 in a region adjoining the flange 2. In the embodiment shown in FIG. 1, the slope angle of the conical hinge section 10 is about 10°. The conical hinge section 10 is followed by a cylindrical section 20 of the ferrule which forms the larger part of the length of the crimping ferrule.

The distance of the groove 34 from the stop collar 32 is selected such that the lower edge 6 of the flange 2 is, in the initial position of the crimp coupling, located above the groove 34.

Figure 2:
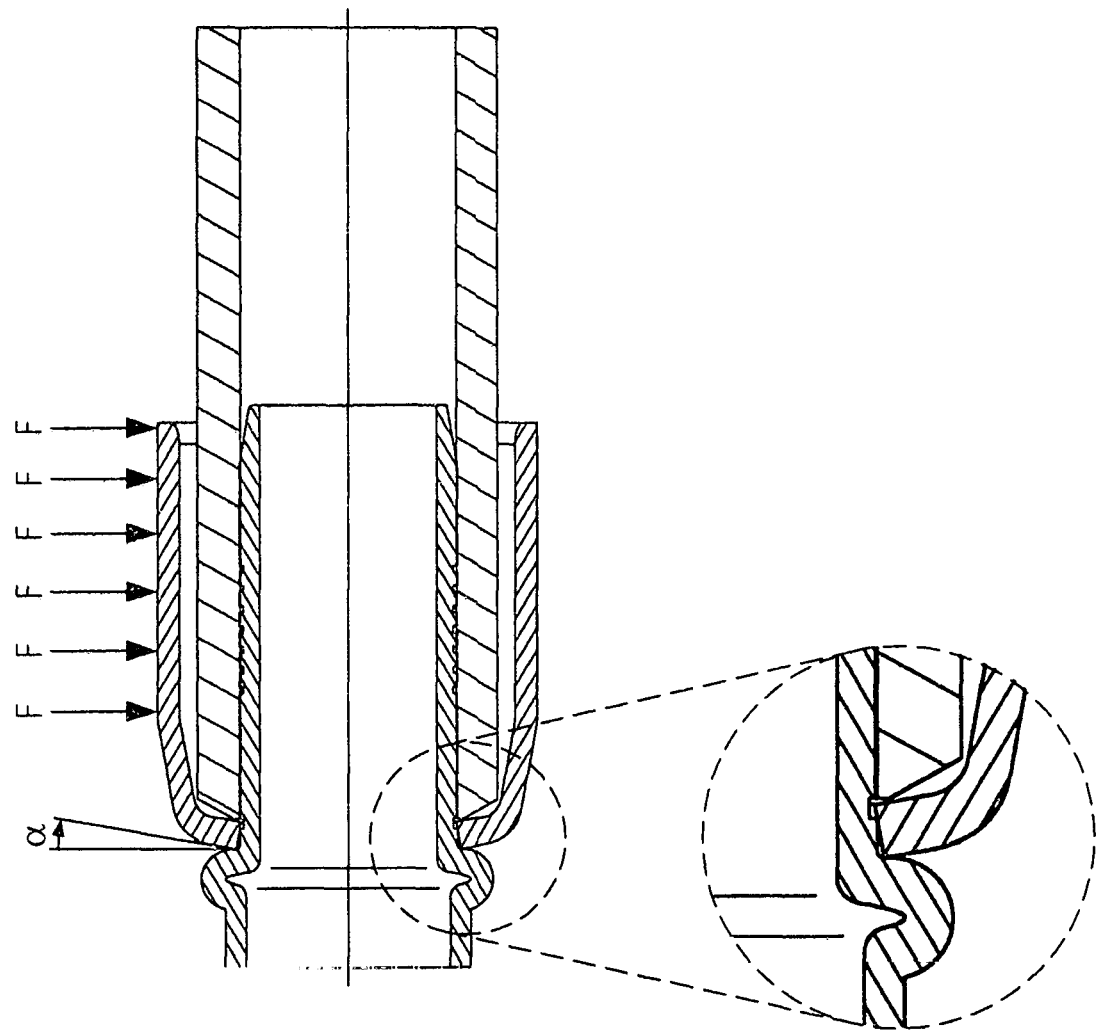
Figure 3:
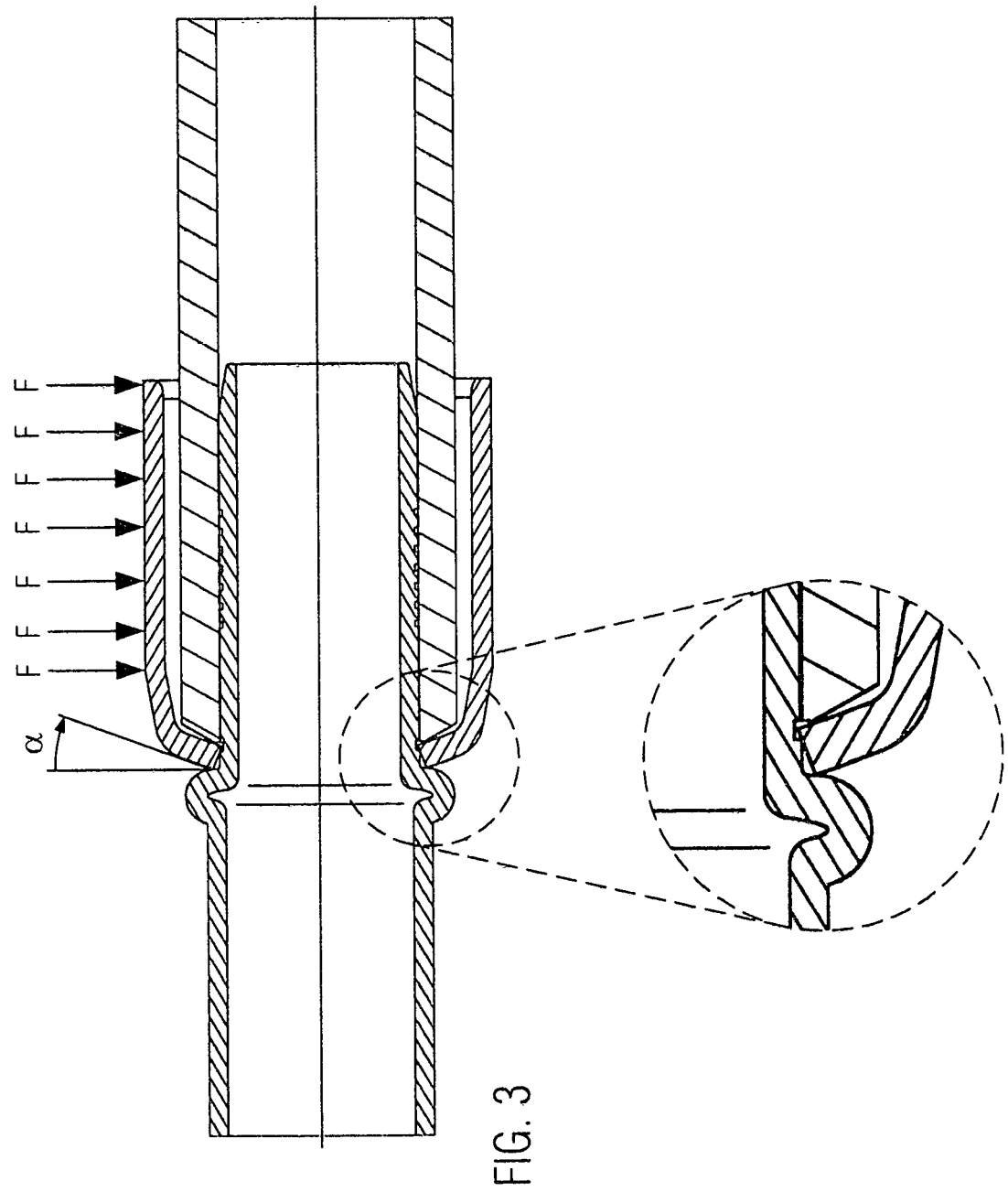

After the crimping ferrule 1 and the hose 8 are slid onto the pipe end of the fitting 30 in FIG. 1, the first step of the crimping process has started in FIG. 2, where, in the area of the cylindrical section 20, forces directed towards the ferrule axis are applied by means of a crimping tool, which forces are schematically indicated in FIG. 2 by some force vectors F. In this first step, the deforming forces are applied only onto the cylindrical section 20, but not onto the conical hinge section 10. As a result, the diameter of the crimping ferrule in the cylindrical portion 20 is reduced, as shown in FIG. 3. The conical hinge section 10 is supported in this phase via the adjoining flange 2 by the fitting 30 such that the conical hinge section 10 cannot follow the reduction of the cylindrical section 20 to a smaller diameter. Thus, the slope angle of the ferrule wall of the conical hinge section 10 is reduced relative to the ferrule axis, wherein the flange 2 is pivoted (change of slope), as indicated by the angle α, which angle has increased in FIG. 3 relative to FIG. 2.

Figure 4:
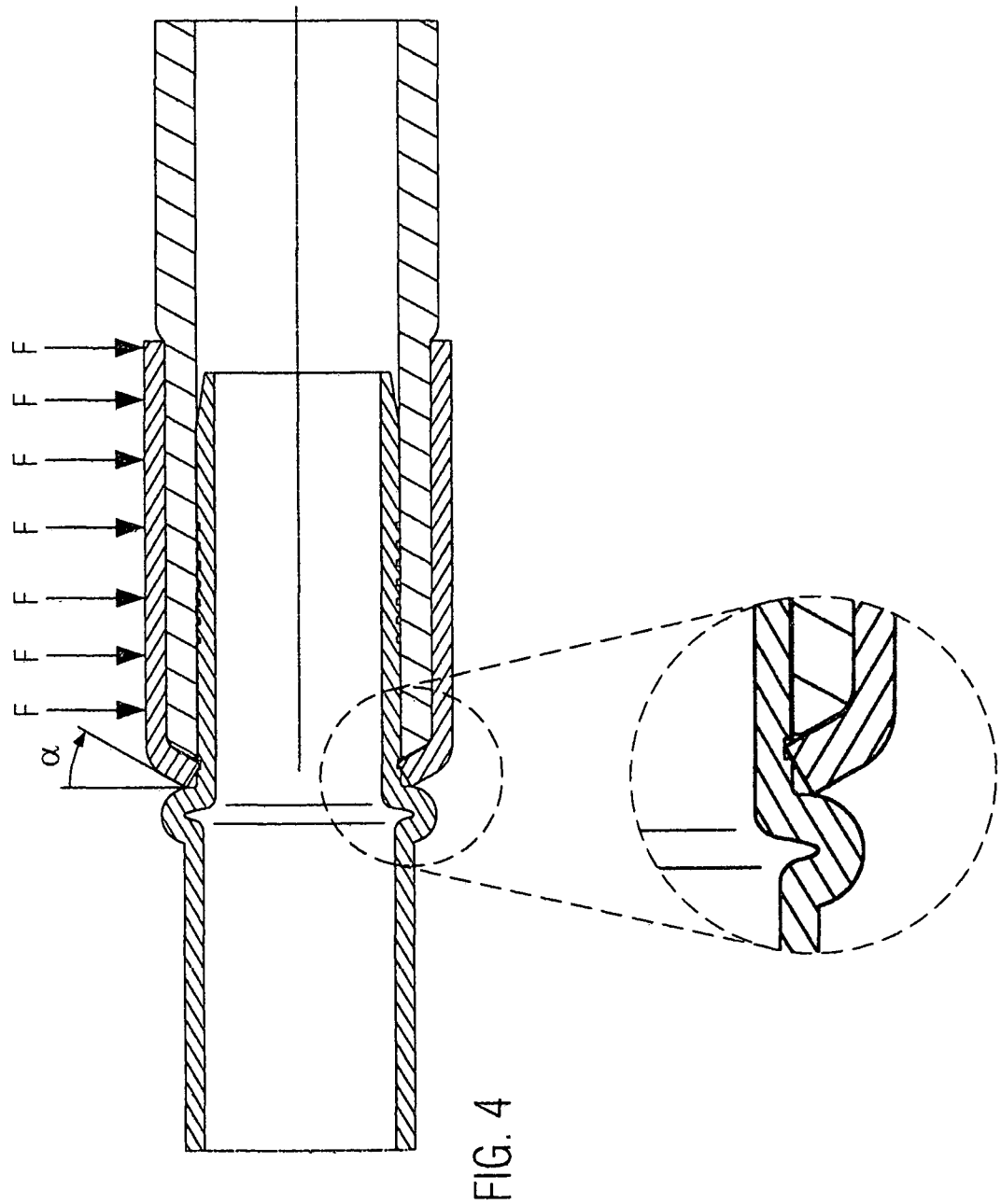
Figure 5:
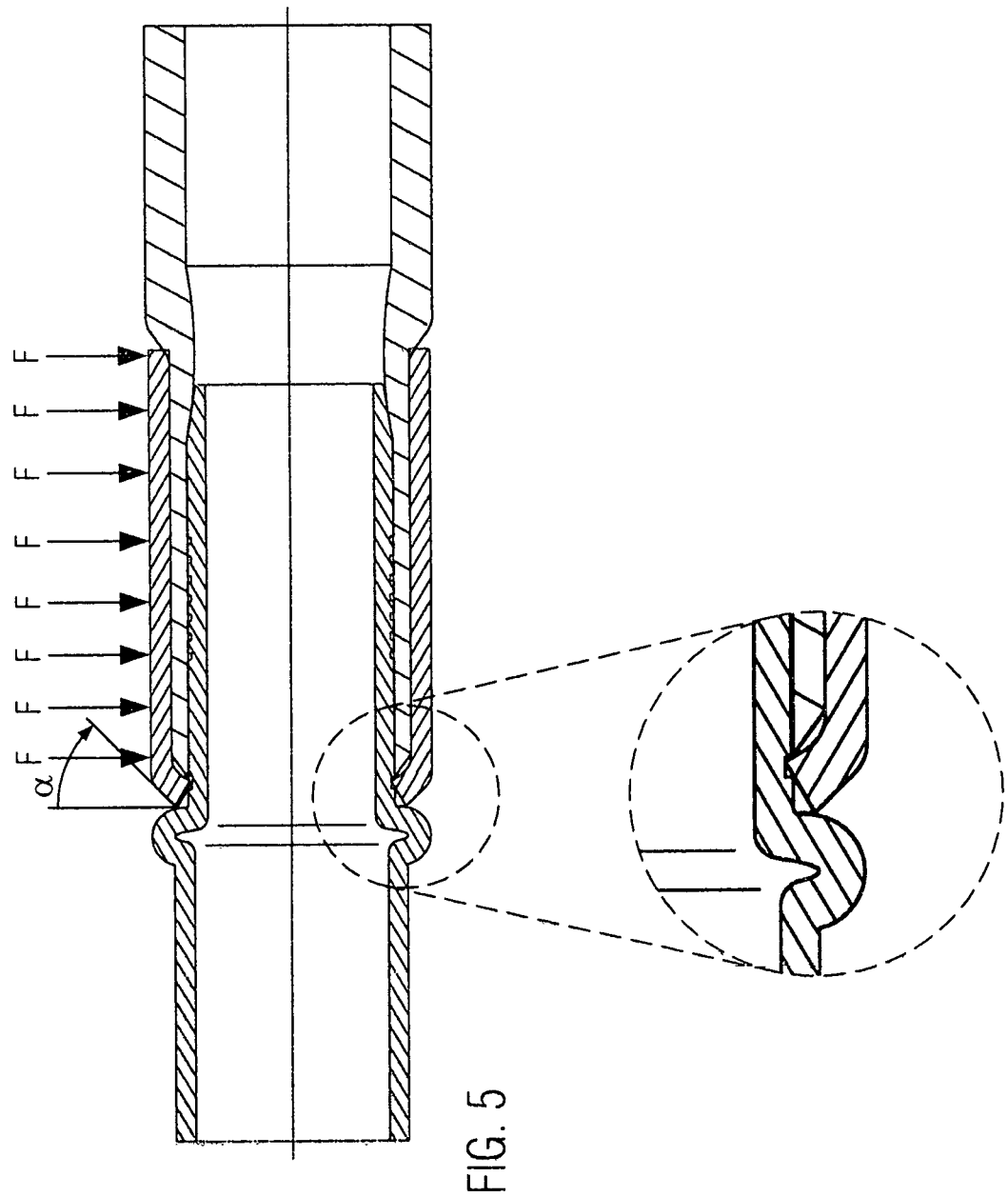

In the second step of the crimping process, which is shown in FIGS. 4 and 5, the squeezing forces are applied to both the initially conical hinge section 10 and the cylindrical section 20 to cause a further reduction in diameter. In this way, the initially conical hinge section 10 is deformed by the reduction in diameter of the cylindrical section 20 in a cylindrical section, as shown in FIG. 4, resulting in a further increase of the angle α (angle of the front wall of the flange 2 with respect to a perpendicular to the ferrule axis). It can also be seen in FIG. 4 that the pivotal movement of the flange 2 has caused that the lower edge 6 of the flange 2, which faces away from the stop collar 4, has been turned into the groove 34.

In the stage shown in FIG. 4, the inner wall of the crimping ferrule has reached the outer wall of the hose. In the further course of the second step of the crimping process, the diameter of the crimping ferrule is further reduced, such that the hose 8 is clamped between the fitting 30 and the crimping ferrule 1. In the transition from FIG. 4 to FIG. 5, the diameter of the crimping ferrule is further reduced, whereby the flange 2 of the crimping ferrule is bent further in a forward direction, with the result that the lower edge 6 of the flange 2 is further turned into the groove 34. The further turning and bending of the flange 2 at the end of the crimping process can be seen by the enlargement of the angle α in FIG. 5.

In the clamped state of the hose 8, as shown in FIG. 5, the function of the additional, above described grooves in the surface of the fitting also becomes clear. Due to the profiles formed by the grooves, the hose 8 is in the clamped condition better secured to the fitting against axial movements. In addition thereto, the additional grooves improve the sealing of the fitting within the hose, because material of the flexible hose is pressed into the grooves due to the clamping, such that a plurality of axially successive grooves forms a series of successive "sealing rings". The additional grooves are preferably made in the same step in which the groove adjacent to the stop is formed for the positive engagement. This can be done by using a rolling tool having one roller for each of the grooves, wherein all grooves are rolled at the same time by the rolling tool.

As a material for the crimping ferrule, a low carbon steel called DC04 (according to DIN EN 10130) can be used, which is suitable for deep drawing. After deep drawing, the preformed crimping ferrule is exposed to an annealing treatment to make the material softer again, as it undergoes further severe deformation during the crimping process. Such a crimping ferrule made of low carbon steel is then protected against corrosion, e.g., by a galvanic treatment with a zinc-nickel coating. As an alternative material for the crimping ferrule stainless steel can be used. The advantage of stainless steel is that it does not require corrosion protection, but is, on the other hand, more expensive than low-carbon steel. For applications with very high quality requirements, an austenitic stainless steel is preferred, e.g., XCrNi 18-10 according to DIN EN 10088. In principle, brass can also be used as the material for the crimping ferrule.

For the typical intended applications, the crimping ferrule is manufactured with a wall thickness of 1.6 mm, for example. For less stressed applications, wall thicknesses in the range of 1.2 to 1.4 mm could also be provided, while for more heavily loaded applications wall thicknesses in the range of 1.8 to 2 mm could be provided. Of course, depending on the application, larger or smaller wall thicknesses can be used.

A typical application for the crimp coupling involves a hose having an inner diameter of 16 mm, which consists of an inner tube made of PTFE and an outer reinforcement made of stainless steel wire mesh. Such a hose is used for compressed air at the engine of a truck. The high operating temperatures of up to 160° C. in combination with pressure values of up to 16 bar, and the pressure fluctuations and temperature changes (from cold to working temperature and back in many cycles over the lifetime) could lead to deteriorations of the crimp connection, if the compression of the crimp connection decreases over the lifetime, which leads to risks of detachment of the hose or risks of leaks. Therefore, a solid, positive crimp connection with mechanical locking is preferred, as in the present case by means of the edge of the flange located within the groove of the fitting.

The fitting can be made of a steel pipe. This pipe can be processed by cold forming to fold the stop collar 32. Further, the groove 34 may be formed by cold forming with a rolling tool.

The invention claimed is:

1. A crimp coupling for connecting a hose to a fitting, comprising:
   a fitting on which an outwardly projecting stop collar and a groove are formed, said fitting defining a longitudinal axis, said groove circumferentially extending around the fitting at a constant axial distance to the stop collar, and
   a crimping ferrule which can be slid onto the fitting, and in which a circular opening is stamped in a closed bottom side for sliding the crimping ferrule onto the fitting, wherein a front end of the crimping ferrule comprises a flange directed towards a ferrule axis, said flange having a stamped wall surface parallel to the ferrule axis, and wherein the crimping ferrule also comprises, opposite to the flange, a cylindrical section extending over a major part of a length of the crimping ferrule, wherein the groove is spaced a distance from the stop collar along the longitudinal axis with the distance between the stop collar and the groove of the fitting dimensioned such that the flange, when in abutment on the stop collar, is disposed with a frontward lower edge of the flange facing the stop collar between the stop collar and the groove of the fitting, and a rearward lower edge of the flange facing away from the stop collar above the groove, wherein between the cylindrical section and the flange a hinge section is tapered starting with a larger radius at an adjoining cylindrical section and tapering to a smaller radius at an adjoining end of the flange in such a manner that the hinge section, due to a diameter reduction of the cylindrical section during crimping, pivots with an end of the hinge section carrying the flange in an outward direction relative to the cylindrical section while approaching a parallel orientation to the ferrule axis, whereby the flange is pivoted such that the lower edge of the flange facing away from the stop collar is turned into the groove by the pivotal movement of the flange and the frontward lower edge remains outside of the groove.

2. The crimp coupling according to claim 1, wherein a ferrule wall in the hinge section has an average slope in the range between 5° and 30° to the ferrule axis.

3. The crimp coupling according to claim 1, wherein the tapering of the hinge section is formed in such a manner that the hinge section bridges a radius range to the ferrule axis such that the ratio between the larger radius and the smaller radius amounts to at least 5%.

4. The crimp coupling according to claim 3, wherein the ratio between the larger radius and the smaller radius is between 10% and 15%.

5. The crimp coupling according to claim 1, wherein a ferrule wall is conically tapered in the hinge section.

6. The crimp coupling according to claim 5, wherein the ferrule wall extends in the hinge section at an angle in the range between 5° and 30° to the ferrule axis.

7. The crimp coupling according to claim 1, wherein the cylindrical section occupies more than 60% of the length of the crimping ferrule in a longitudinal direction.

8. The crimp coupling according to claim 1, wherein the hinge section occupies between 10% and 30% of the length of the crimping ferrule in a longitudinal direction.

9. The crimping ferrule according to claim 1, wherein the crimping ferrule is made of low carbon steel, stainless steel or brass.

10. The crimping ferrule according to claim 1, wherein the crimping ferrule has a wall thickness in the range 1 mm to 2 mm.

11. The crimp coupling according to claim 1, wherein the crimping ferrule is formed by deep drawing.

12. A method for connecting a hose to a fitting utilizing a crimp coupling according to claim 1, wherein the crimping ferrule and the hose are slid onto the fitting until the flange of the crimping ferrule comes into abutment on the stop collar, and the hose is slid onto an end of the fitting surrounded by the crimping ferrule and an inserted end of the hose is in abutment on an inner side of the flange, in a first crimping step forces directed towards the ferrule axis are exerted exclusively on the cylindrical section to reduce a diameter of the cylindrical section until the inner side of the cylindrical section reaches the hose, to thereby reduce the sloping angle of the hinge section to the ferrule axis, in a subsequent second crimping step forces are exerted on the cylindrical section as well as on the hinge section until the hose is clamped between the crimping ferrule and the fitting, whereby the hinge section has, by the first and second crimping steps, approached a cylindrical shape, and by the reduction of the slope of the hinge section, the lower edge of the flange turns into the groove.

* * * * *